Figure 1:
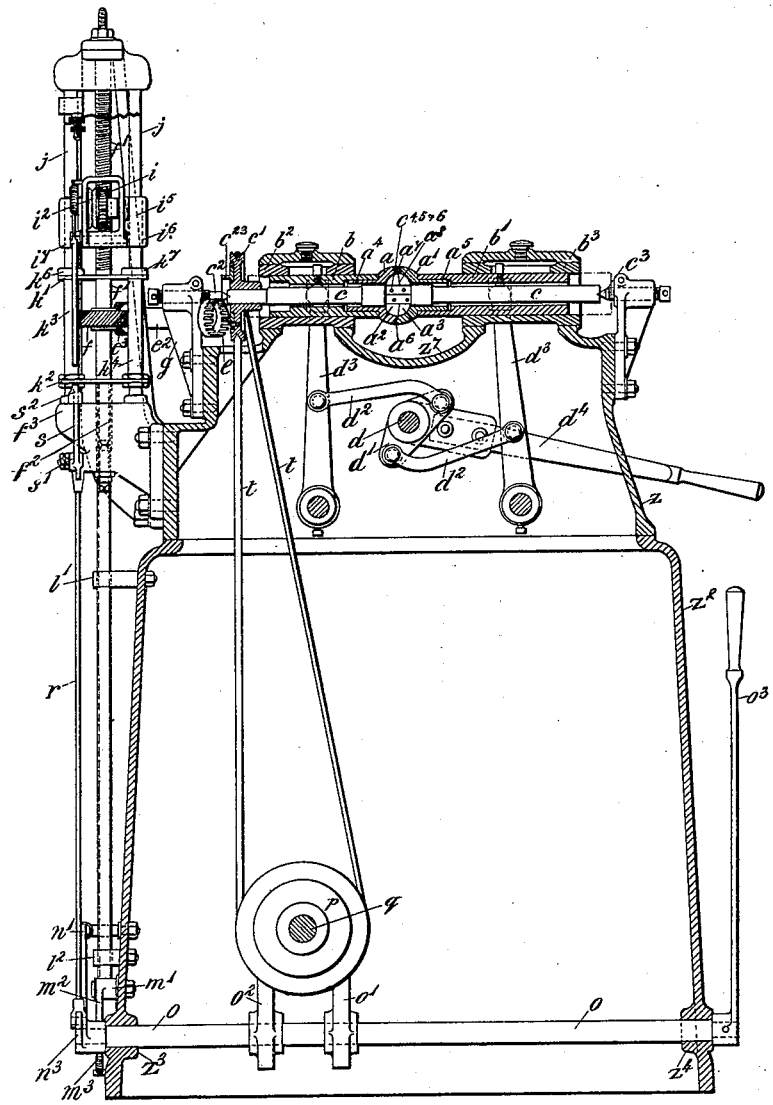

No. 691,219. Patented Jan. 14, 1902.
J. WEST.
MACHINE FOR FORMING AND FINISHING EDGES OF LENSES.
(Application filed May 20, 1901.)
(No Model.) 5 Sheets—Sheet 1.

No. 691,219. Patented Jan. 14, 1902.
J. WEST.
MACHINE FOR FORMING AND FINISHING EDGES OF LENSES.
(Application filed May 20, 1901.)
(No Model.) 5 Sheets—Sheet 3.

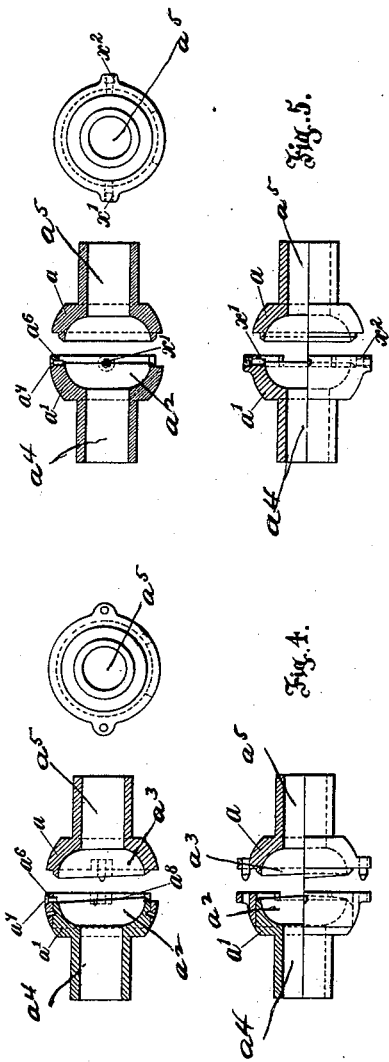

No. 691,219. Patented Jan. 14, 1902.
J. WEST.
MACHINE FOR FORMING AND FINISHING EDGES OF LENSES.
(Application filed May 20, 1901.)
(No Model.) 5 Sheets—Sheet 5.
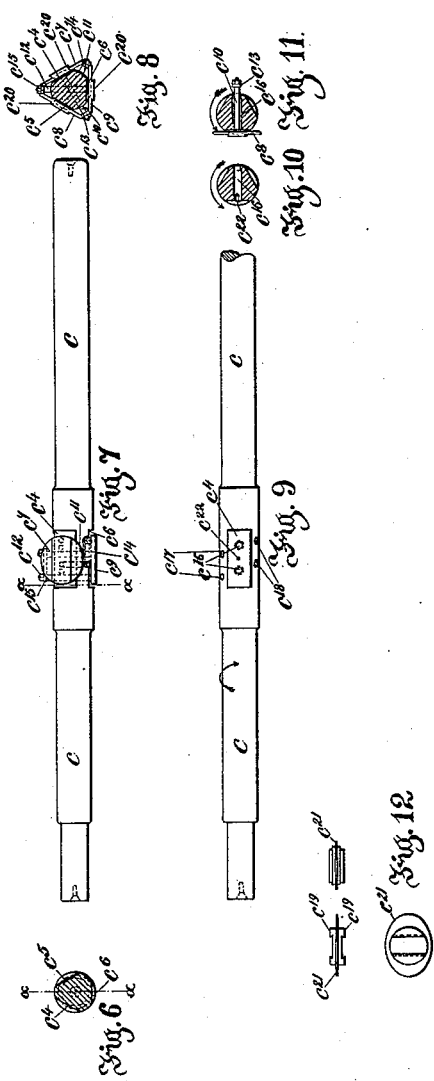

UNITED STATES PATENT OFFICE.

JAMES WEST, OF DALSTON, ENGLAND, ASSIGNOR OF TWO-THIRDS TO HENRY JOSEPH WILBERFORCE RAPHAEL, OF SHEPHERDS BUSH, MIDDLESEX COUNTY, ENGLAND, AND HERMANN LIONEL ETTINGHAUSEN, OF LONDON, ENGLAND.

MACHINE FOR FORMING AND FINISHING EDGES OF LENSES.

SPECIFICATION forming part of Letters Patent No. 691,219, dated January 14, 1902.

Application filed May 20, 1901. Serial No. 61,137. (No model.)

*To all whom it may concern:*

Be it known that I, JAMES WEST, a subject of the King of Great Britain, residing at Dalston, in the county of Middlesex, England, have invented a certain new and useful Machine for Forming and Finishing the Edges of Lenses, of which the following is a specification.

My invention relates to improvements in machines for shaping and beveling the edges of elliptical and other shaped lenses and glasses, such as are used for spectacles, watch-glasses, and the like; and it has for its object to provide an expeditious and ready means of shaping and beveling such edges and of bringing about uniformity and precision in their sizes.

According to my present invention the elliptical-shaped lenses or glasses are shaped and beveled by being subjected to a rapid rotary motion within a fixed mold whose interior is approximately of a spheroidal form. The edges of the lenses or glasses are made to bear upon the said spheroidal surface of the mold by centrifugal force while some suitable abrading or grinding material is fed in during the motion or beforehand until they are ground away to the shape of the position of the mold upon which they bear, more or less as described in the specification of Letters Patent of the United States of America granted to me, No. 629,634.

The mold in which the grinding and beveling is done is made in two halves, each of whose interiors is recessed to a hemispheroidal form, more or less, in such a way that when they are brought together the said recesses exactly coincide with each other and form one spheroidal chamber, as described and shown in the said former patent. In lieu, however, of the joint between these halves being at right angles to the axis of the mold, as therein shown, such joint having been found to leave an impression or fault upon the lenses operated on, the present invention provides a joint inclined or oblique to the axis in lieu of that described in the said former patent, and it also provides a spindle in the form of a bar supported upon centers at each end. The holes in the said spindle in lieu of being round, as has hitherto been the case, are made of a peculiar shape to allow the legs or pins at the back of the dops greater freedom and immunity from jamming or seizing, due to the presence of particles of material used in grinding. The present invention also provides a rigid and accurate means of supporting, carrying, working, and controlling the mold in which the grinding is performed, and, lastly, the present invention provides a precise means of determining the amount of grinding to be done to each of the lenses and of automatically arresting the action when the desired point has been reached, thereby securing great precision and uniformity in the sizes of the finished lenses.

The objects hereinbefore set forth are attained by the use of the mechanism shown in the accompanying drawings, in which—

Figure 2:
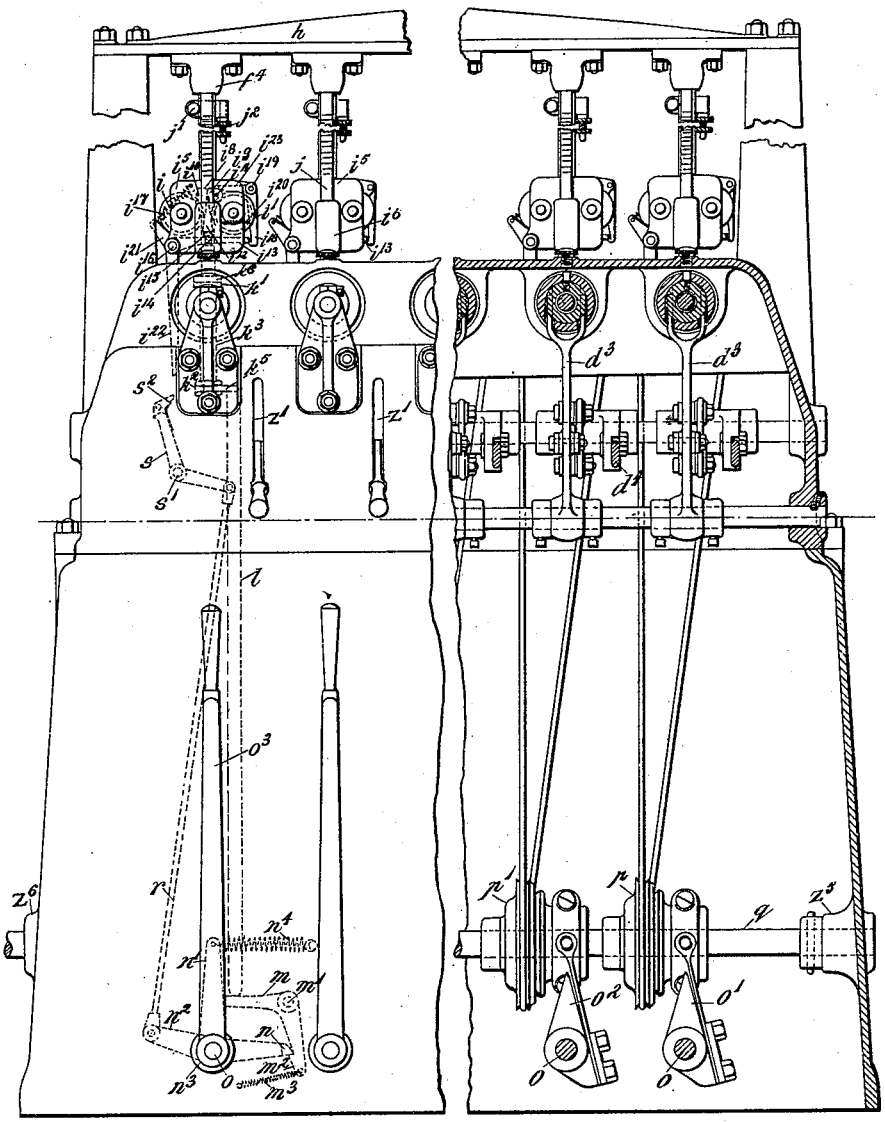
Figure 3:
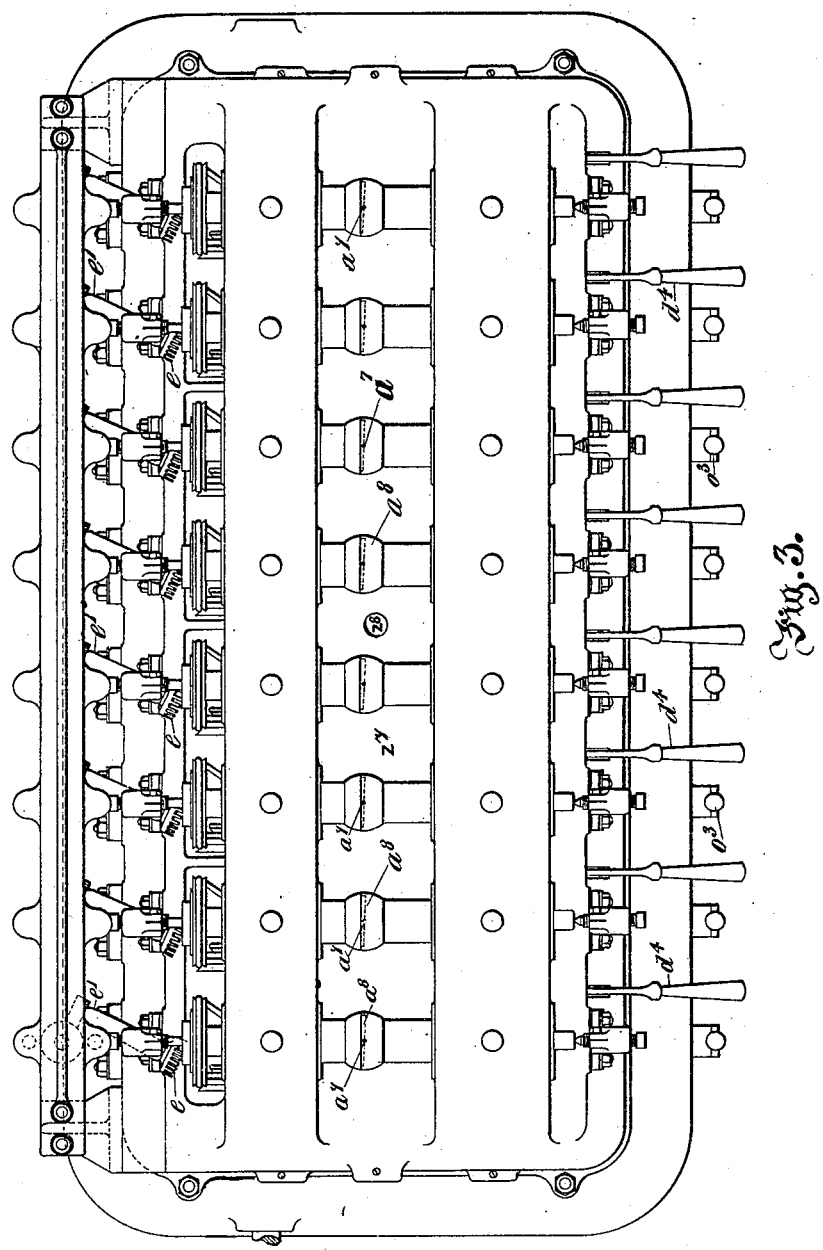

Figure 1 is a sectional view transversely through the casing and through the housing of one of the spindles of a machine having eight sets of grinding apparatus, the operating mechanism being shown in elevation. Fig. 2 is a front view shown partly in section. Fig. 3 is a plan of the machine. Fig. 4 shows in two sections and in front view a hollow grinding-mold with oblique joint. Fig. 5 shows in two sections and in front view a hollow grinding-mold with joint at right angles to axis. Fig. 6 is a transverse section through the enlarged part of the spindle. Fig. 7 is a side view of the spindle with the cradles for the lenses. Fig. 8 is a transverse section of the same, showing the cradles for the lenses in their places. Fig. 9 is a side view of the spindle without the lens-cradles. Figs. 10 and 11 are transverse sections of the spindle without and with the lens-cradle, respectively. Fig. 12 shows side and front views of the dops to which the lens is fixed.

Similar letters of reference refer to similar parts throughout the several views.

$a$ $a'$ represent the hollow grinding-mold of the kind described in the said former specification made in two pieces $a$ $a'$, which are firmly carried in cylindrical slides $b$ $b'$, which allow the parts of the molds to be brought together to close it, as shown in Fig. 1, or to separate sufficiently to open it for the purpose of inserting or removing the lenses and which are free to slide in the bored guides $b^2$ $b^3$, fitted in the box casting or base $z$ of the machine. $a^2$ $a^3$ are hemispheroidal recesses in the two halves of the mold. $a^4$ $a^5$ are axial openings through which passes the spindle or bar $c$, which can be set in rapid motion by a pulley $c'$ at one end. This spindle is supported at each end upon centers $c^2$ $c^3$, carried in brackets $g$, bolted to the box-casting $z$, and it is arranged to pass centrally through the mold and extend through the cylindrical guides.

The mouth of one half $a$ of the mold is recessed into the mouth of the other half $a'$ by means of the ring $a^6$. The oblique joint of the mold is shown at $a^8$ in Figs. 1, 3, and 4. I do not, however, limit myself to making the joint oblique, but may make it as shown in Fig. 5, wherein the joint is shown at right angles to the axis of the mold, but is broken by the tooth or studs of metal $x'$ $x^2$.

The central portion of the spindle or bar $c$ is reinforced or enlarged and has three equidistant flats formed upon the reinforcement, as shown in Figs. 6, 7, 8, and 9 at $c^4$ $c^5$ $c^6$, and against each of these three flats are fitted disks or cradles $c^7$ $c^8$ $c^9$, Figs. 7 and 8, which carry the lenses which are to be ground. Each of these disks or cradles has firmly fixed to its back two parallel pins or bars or legs $c^{10}$ $c^{11}$ $c^{12}$, which pass freely through corresponding holes in the flat sides of the spindle. The pins upon one of these disks are arranged at equal distances at each side of the center, and those upon the other two disks are arranged nearer to the edge of the disk, so that the pins and the holes passing through the spindle may not interfere with each other, as indicated in Figs. 7 and 8. The outer ends of the pins $c^{10}$ $c^{11}$ $c^{12}$ after passing through the spindle $c$ are connected by a cross-bar $c^{13}$ $c^{14}$ $c^{15}$, Figs. 7 and 8. The pins or legs $c^{10}$ $c^{11}$ $c^{12}$ may be made of plain steel or "pinion-steel"; but in any case the holes in the spindle in which they work are formed in the manner shown at $c^{16}$ $c^{17}$ $c^{18}$, Figs. 9, 10, and 11, which shape has been found to prevent most effectually the particles of emery from obstructing their easy working.

The plates or dops on which the lenses are carried and by means of which they are attached to the disks or cradles $c^7$ $c^8$ $c^9$ are shown in Fig. 12 at $c^{19}$. The disks $c^7$ $c^8$ $c^9$ have upon their outer surface a transverse dovetail-shaped guide $c^{20}$, upon which fits freely a corresponding plate or "dop" $c^{19}$, provided with guides fitting upon the guide $c^{20}$, so that it can move or slide freely upon the latter. The lens $c^{21}$, Fig. 12, is fixed by pitch or other strong cement upon the outer face of the plate or dop $c^{19}$, and a similar plate or dop $c^{19}$ is likewise cemented to the other or outer side of the lens $c^{21}$, (by the devices fully set forth and described in my concurrent application, Serial No. 61,136, filed May 20, 1901,) so that when the edge upon one side of the latter has been shaped and beveled it can be reversed in order to bevel the edge on the other side in the same way, the plates or dops $c^{19}$ being fitted upon the dovetailed guide $c^{20}$ of the cradle.

The grinding material may consist of emery, powdered Cragleith stone, Trent sand, tripoli, rouge, or any other suitable agent and may be fed mixed with oil, turpentine or other liquid into the interior of the mold through the orifice $a^7$ by means of a hand-squirt or a cylinder and plunger (not shown in the drawings) or by any other suitable means. Pins $c^{22}$, Figs. 9 and 10, are studded into the flats on the spindle $c$ or into the backs of the disks or cradles $c^7 c^8 c^9$, so as to raise them slightly above the flat surfaces, and thus to prevent or destroy the suction or vacuum formed by the liquid used in grinding. During the process of grinding the mold is kept rigidly closed, and it is opened and closed by means of the toggle-link work and levers shown in Figs. 1 and 2, wherein $d$ is a fixed shaft carrying the wrist-plate $d'$, which is connected, by means of links $d^2$, to the forked levers $d^3$, whose forked ends are controllable in contact with the cylindrical slides $b$ $b'$. The lever-handles $d^4$ are fixed to the wrist-plates $d'$ and extend out through the casting or base of the machine and are intended to give motion to same from the outside of the box-casting $z$, which is slotted at $z'$ to allow of the stroke of the handles. To the face of the wheel or pulley $c'$ on the spindle $c$ is fixed a scroll or spiral rib $c^{23}$, which gears with a toothed wheel or pin-wheel $e$, keyed to the shaft $e'$, passing obliquely through and running in bearings $e^2$ in the bracket $g$, supporting the centers $c^2$ $c^3$. At the opposite end of shaft $e'$ is a spiral pinion $e^3$, gearing with a spiral spur-wheel $f$, keyed to an upright leading-screw $f'$. The lower end of the leading-screw $f'$ is carried in footsteps $f^2$ in the bracket $f^3$, while its upper end is freely socketed into the bracket $f^4$, fixed to the bar-framing $h$. The motion of the spindle $c$ is thereby transmitted to the upright leading-screw, which is intended to tally or count the revolutions and to act as a counting device and throw the grinding apparatus out of gear after a certain definite number of revolutions in the following manner: An upright bar-guide $j$ is fixed on each side of the upright leading-screw $f'$, so as to be in alinement or parallel with the same, the upper and lower ends of each guide being socketed in the brackets $f^4$ and $f^5$, respectively. Two worm-wheels $i$ $i'$, gearing into the opposite sides of the upright leading-screw $f'$ on spindles to which are keyed two V-wheels $i^2$ $i^3$, are combined into and united with a metallic "monkey" $i^5$, which is provided with two bored guides $i^6$ $i^7$, embracing the two upright bar-guides $j$, the whole being arranged to travel up and down the guides through the action of the screw $f'$. Two brake-blocks $i^8$ $i^9$ lie upon the V-wheels $i^2$ $i^3$ and are pivotally fixed to the pins $i^{10}$ $i^{11}$ in the monkey $i^5$. A wedge $i^{12}$ is forcibly driven between the brake-blocks $i^3$ $i^9$, causing them to jam upon the V-wheels $i^2$ $i^3$, arresting their motion, likewise that of the worm-wheels, thereby locking the monkey to the leading-screw $f'$. The wedge $i^{12}$ is attached to the trip $i^{13}$ by means of the screw-stud $i^{14}$, and a spiral spring $i^{15}$ inserted between, so as to give the trip $i^{13}$ some range before withdrawing the wedge.

The trip $i^{13}$ forms one arm of a three-armed piece pivoted at $i^{16}$ to the monkey $i^5$. Its free end is shown caught and held by the claw $i^{18}$. To another arm $i^{21}$ of this piece is attached the spiral spring $i^{17}$, which hastens its action. The third arm $i^{22}$ extends downward to make intermittent contact with the pawl $s^2$. The claw $i^{18}$ forms one arm of a bell-crank lever pivoted at $i^{19}$ to the monkey $i^5$ and is kept to its work by the spring $i^{20}$.

In the drawings the monkey is shown slightly raised above its lowest position and locked onto the leading-screw. If motion were imparted to the leading-screw, the monkey would now ascend.

To one of the upright bar-guides $j$ is clamped an adjustable wiper $j'$, which may be set at any desired height and which is fitted with a fine adjustment-screw $j^2$. As the monkey is carried upward by the continued motion of the leading-screw the trip-lever arm $i^{23}$ of the bell-crank pivoted at $i^{19}$ is brought against the point of the fine adjustment-screw and tripped or released, whereupon the wedge $i^{12}$ is withdrawn, leaving the V-wheels and worm-wheels free to revolve, and the monkey rapidly descends. Conveniently arranged to receive the weight of the falling monkey is a device consisting of a pair of cross-heads $k'$ $k^2$, united at some distance apart by two guide-sleeves $k^3$ $k^4$, which embrace the upright bar-guides and which are free to slide thereon. The lower cross-head $k^2$ is provided with a projecting lug $k^5$, which rests upon the head of an upright rod $l$, supported in guides $l'$ $l^2$, attached to the base-casting $x^2$. The impact of the monkey is modified by two leather washers placed upon the upper cross-head $k'$ at $k^6$ $k^7$ and is transmitted through the cross-head device just described to the rod $l$, which rests upon one arm of a bell-crank lever $m$, pivoted at $m'$, the other arm being formed into a claw at $m^2$ and controlled by a spiral spring $m^3$. The impact of the falling monkey causes the claw $m^2$ to release its hold of the trip $n$, forming one arm of a three-armed piece $n$ $n'$ $n^2$, which is keyed to one end of the shaft $o$ at $n^3$. The shaft $o$ lies in the base $z^2$ of the machine in bearings at $z^3$ $z^4$. Spring-levers $o'$ $o^2$ are keyed to the shaft $o$ for the purpose of operating the combined wheels and friction-clutch, which may be of any of the well-known forms and designs, so that when the trip $n$ is released the shaft $o$ is pulled over through the medium of the lever-arm $n'$ and the spring $n^4$ and the clutch is thrown out of gear.

It will be understood that separate apparatus of the kind described is applied to each set of grinding apparatus contained in the machine.

Motion is led to the clutches $p$ by the shaft $q$, lying in the base $z^2$ and running in bearings $z^5$ $z^6$. The shaft $o$ is provided at one end, convenient to the operator, with a lever-handle $o^3$, which is used for throwing the clutch $p$ into gear. For this purpose the handle $o^3$ is pulled over until the trip $n$ comes into the claw $m^2$, where it is left at rest until tripped by the monkey. The tension-rod $r$ communicates with the bell-crank lever $s$, pivoted at $s'$ and provided with a pawl $s^2$ at its upper end, which actuates the three-armed piece $i^{13}$ $i^{21}$ $i^{22}$, pivoted to the monkey at $i^{16}$, and places its trip in the claw $i^{18}$ when the monkey is down at rest.

The part of the friction-clutch $p$ constituting the band-wheel $p'$ is free upon the shaft $q$, so that when the clutch is thrown into gear with it by the spring-levers $o'$ $o^2$ upon the shaft $o$ it is set in motion, which it transmits, through the medium of the band $t$, to the V-wheels $c'$ on the spindle $c$.

At $z^7$ in Figs. 1 and 3 is shown a gutter, which is formed in the box-casting $z$ for the purpose of catching the oil and drainage from the grinding cup or mold.

A discharge-hole is made at $z^8$, where the stuff is caught in any suitable vessel placed in the base-casting $z^2$.

Having fully described my invention, what I desire to claim and secure by Letters Patent is—

1. In a device of the character described, a mold formed of two members, one member having a recess, and the other member having a flange adapted to enter said recess, the line formed by the meeting edges of the two members being oblique to a plane at right angles to the axis of the mold, substantially as described.

2. In a device of the character described, a mold formed of two members one member having a recess, and the other member having a flange adapted to enter said recess, the line formed by the meeting edges of the two members being oblique to a plane at right angles to the axis of the mold, and means for clamping the two members together, substantially as described.

3. In combination with a mold in two halves, in which the grinding and beveling are done, a concentric spindle carrying the lenses and turning upon adjustable cone-bearings at its ends, the spindle being provided near one end with a pulley by which it is set in revolution, substantially as described and illustrated.

4. In a device of the character described, the combination of a spindle having transverse holes therethrough, through which the guides for the dops carrying the lenses pass, the said holes having interior ribs to prevent jamming, substantially as described.

5. The combination of the two parts $a$, $a'$, of the grinding-mold, cylindrical slides $b$, $b'$, guides $b^2$, $b^3$, in the box-casting $z$ of the machine, shaft $d$, wrist-plate $d'$, links $d^2$, forked levers $d^3$, whose forked ends fit upon the slides $b$, $b'$, and lever-handles $d^4$, passing through slots $z'$ in the casting $z$, substantially as described and illustrated.

6. In combination with the grinding-mold $a$, $a'$, slides $b$, $b'$, guides $b^2$, $b^3$, in the box-casting $z$ of the machine, the central spindle $c$ turning on adjustable centers $c^2$, $c^3$ and the driving-pulley $c'$, substantially as described and illustrated.

7. The spiral rib or scroll $c^{23}$, pin-wheel $e$, upon oblique shaft $e'$ running in bearing $e^2$, spiral pinion $e^3$ upon shaft $e'$, gearing with spiral spur-wheel $f$, upon bearing-screw $f'$ turning in footstep $f^2$ and bearing $f^4$, guide-bars $j$, monkey $i^5$ moving upon guide-bars $j$, worm-wheels $i$, $i'$, gearing with screw $f'$, V-wheels $i^2$, $i^3$, brake-blocks $i^8$, $i^9$, turning upon pins $i^{10}$, $i^{11}$, in monkey $i^5$, wedge $i^{12}$, the brake-blocks $i^8$, $i^9$, upon the V-wheels $i^2$, $i^3$, trip-bar $i^{13}$ pivoted at $i^{16}$ to monkey $i^5$, and carrying the wedge $i^{12}$, screw-stand $i^{14}$, and spring $i^{15}$ three-armed piece consisting of arm $i^{21}$ and spring $i^{17}$ arm $i^{13}$ held by bell-crank arm $i^{18}$ and arm $i^{22}$ pivoted at $i^{19}$ to monkey $i^5$, spring $i^{20}$, adjustable wiper $j'$ and adjusting-screw $j^2$, lever-arm $i^{23}$ forming part of bell-crank arm $i^{18}$, cross-heads $k'$, $k^2$, united by guide-sleeves $k^3$, $k^4$, projecting lug $k^5$ on cross-head $k^2$, upright rod $l$ and guides $l'$, $l^2$, washer $k^6$, $k^7$, bell-crank lever $m$ pivoted at $m'$, claw-arm $m^2$, spring $m^3$, trip-arm $n$ upon shaft $o$ turning in bearings $z^3$, $z^4$, arm $n'$, spring $n^4$, and spring disengaging-levers upon the shaft $o$, disengaging friction-clutches upon the driving-shaft $q$ of the machine, all substantially as and for the purpose described and illustrated.

8. In combination with the shaft $o$, the lever-handle $o^3$ for throwing the friction-clutch $p$ into gear, the rod $r$, bell-crank lever $s$ pivoted at $s'$ and having pawl $s^2$, and the arm $i^{22}$ operated by pawl $s^2$, for bringing back the arm $i^{13}$ under the claw $i^{18}$ when the monkey $i^5$ has descended to its lowest position, substantially as described and illustrated.

9. In a device of the character described, the combination with a spindle having transverse holes therethrough dops having guides passing through said holes, and interior ribs in said holes to prevent jamming; of a mold formed in two members inclosing said spindle and means for clamping said members together, substantially as described.

In witness whereof I have hereunto set my hand in the presence of two witnesses.

JAMES WEST.

Witnesses:
ALFRED T. BRATTON,
H. ARTHUR MARSHALL.